United States Patent [19]
Huang

[11] Patent Number: 5,289,161
[45] Date of Patent: Feb. 22, 1994

[54] TIRE PRESSURE INDICATOR

[76] Inventor: Tien-Tsai Huang, No. 4, Lane 30, Wu-Chang St., Pan-Chiao City, Taiwan

[21] Appl. No.: 882,897

[22] Filed: May 14, 1992

[51] Int. Cl.$^5$ .................................... B60C 23/00
[52] U.S. Cl. ................................ 340/447; 340/442; 152/417; 73/146.5; 116/34 R; 200/61.22
[58] Field of Search ............... 340/442, 447; 152/415, 152/416, 417; 73/146.4, 146.5; 116/34 R; 200/61.22

[56] References Cited

U.S. PATENT DOCUMENTS

| | | |
|---|---|---|
| 4,062,287 | 12/1977 | Millray .................. 152/415 |
| 4,814,745 | 3/1989 | Wang .................... 340/442 |
| 5,001,457 | 3/1991 | Wang . |
| 5,025,244 | 6/1991 | Huang . |
| 5,035,137 | 7/1991 | Burkard et al. ........ 340/442 |
| 5,109,213 | 4/1992 | Williams ............... 340/442 |
| 5,119,066 | 6/1992 | Ballyns ................. 340/442 |
| 5,130,694 | 7/1992 | Zainaleian ............ 340/442 |

Primary Examiner—John K. Peng
Assistant Examiner—Nina Tong
Attorney, Agent, or Firm—Oblon, Spivak, McClelland, Maier & Neustadt

[57] ABSTRACT

The pressure gauge of a tire pressure indicator includes a casing which has a hollow adaptor to be attached to the pneumatic tire, an air inlet and a finger piece for opening an inflating valve of the tire. A diaphragm is disposed inside the casing adjacent to the air inlet and is movable, in response to an inlet pressure entering through the air inlet, between a first position in which the inlet pressure is below a predetermined low pressure limit and a second position in which the inlet pressure is above a predetermined high pressure limit. A spring-loaded push rod is movably mounted inside the casing and is moved by the diaphragm. A signal producing unit is provided inside the casing and has first and second switch devices which are controlled by the movement of the push rod. The first switch device activates the signal producing unit when the diaphragm is in the first position. The second switch device activates the signal producing unit when the diaphragm is in the second position.

7 Claims, 4 Drawing Sheets

TIRE PRESSURE INDICATOR

BACKGROUND OF THE INVENTION

1. Field of the Invention

The invention relates to a tire pressure indicator, more particularly to a tire pressure indicator which generates an alarm signal whenever a tire is under- or over-inflated.

2. Description of the Related Art

U.S. Pat. No. 5,001,457 discloses an electronic signal device for a set of pneumatic tires, which signal device includes a pressure gauge attached to each of the pneumatic tires and which transmits an electrical signal whenever the tire is under-inflated. The signal transmitted by the pressure gauge is received by a receiver circuit found inside the driver room of the vehicle. The receiver circuit activates a display means so as to indicate to the driver which one of the tires is under-inflated.

U.S. Pat. No. 5,025,244 and co-pending U.S. patent application Ser. No. 07/704,195, both by the applicant, disclose a tire pressure indicator which generates a light signal when the tire to which the tire pressure indicator is attached is under-inflated.

Note that the above-cited references are capable of generating an alarm signal when the tire is under-inflated. However, none of the above-cited references are capable of generating an alarm signal when the tire is over-inflated.

SUMMARY OF THE INVENTION

A main object of the present invention is to provide a pressure gauge which generates an alarm signal when the tire to which the pressure gauge is attached is under- or over-inflated.

Another object of the present invention is to provide a tire pressure indicator which comprises a pressure gauge attached to each of the pneumatic tires of a vehicle and which is capable of informing the driver of the vehicle as to which one of the tires is under- or over-inflated.

Accordingly, the preferred embodiment of a pressure gauge of the present invention is to be used with a pneumatic tire and includes a casing which has a hollow adaptor to be attached to the pneumatic tire, an air inlet and a finger piece for opening an inflating valve of the tire. A diaphragm is disposed inside the casing adjacent to the air inlet and is movable, in response to an inlet pressure entering through the air inlet, between a first position in which the inlet pressure is below a predetermined low pressure limit and a second position in which the inlet pressure is above a predetermined high pressure limit. A spring-loaded push rod is movably mounted inside the casing and is moved by the diaphragm. A signal producing unit is provided inside the casing and has first and second switch devices which are controlled by the movement of the push rod. The first switch device activates the signal producing unit when the diaphragm is in the first position. The second switch device activates the signal producing unit when the diaphragm is in the second position.

In another aspect of the present invention, a tire pressure indicator of the present invention comprises a plurality of the above-described pressure gauges. Each of the pressure gauges are attached to a respective one of the pneumatic tires of a vehicle and are further provided with a signal transmitting unit. The first switch device of each pressure gauge activates the signal transmitting unit to transmit a first code unique to that gauge when the diaphragm is in the first position. The second switch device of each pressure gauge activates the signal transmitting unit to transmit a second code unique to that gauge when the diaphragm is in the second position. A receiver device receives the first and second codes transmitted by the signal transmitting unit of the pressure gauges. The receiver device includes a plurality of first and second light emitting units. One of the first light emitting units is activated upon reception of the first code so as to indicate which one of the tires is under-inflated. One of the second light emitting units is activated upon reception of the second code so as to indicate which one of the tires is over-inflated.

BRIEF DESCRIPTION OF THE DRAWINGS

Other features and advantages of the present invention will become apparent in the following detailed description of the preferred embodiment, with reference to the accompanying drawings, of which.

DESCRIPTION OF THE PREFERRED EMBODIMENT

Figure 1:
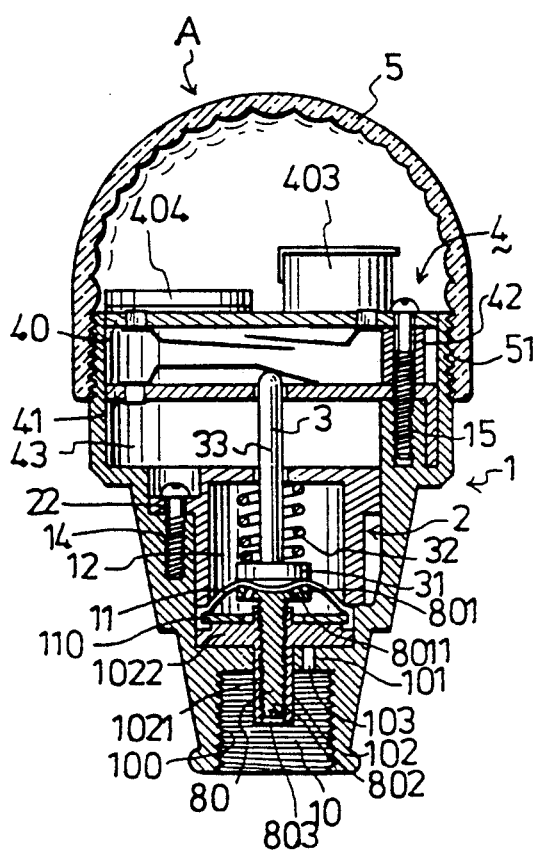
FIG. 1 is a sectional view of the preferred embodiment of a pressure gauge according to the present invention.

Referring to FIG. 1, the preferred embodiment of a pressure gauge (A) according to the present invention is shown to comprise a casing having a hollow adaptor (1) and a cap (5), a disc member (2), a spring-loaded push rod (3) and a signal producing device (4).

The hollow adaptor (1) has an open end (10) which is formed with an internal thread (100) so as to connect threadedly with an inflating valve of a pneumatic tire. A transverse partition plate (101) extends adjacent to the open end (10) of the hollow adaptor (1). A finger piece (102) extends axially from the partition plate (101) to open the inflating valve of the tire when the adaptor (1) is mounted thereon. The partition plate (101) is further provided with an air inlet (103) to permit the entry of air from the tire into the hollow adaptor (1).

The finger piece (102) is detachable from the partition plate (101) and is provided with radial flanges (1022) which rest against an upper side of the partition plate (102), thereby supporting the finger piece (102) on the partition plate (101). The finger piece (102) is further formed with a threaded axial bore (1021) which receives the threaded shaft portion (802) of a bolt (80).

The bolt (80) has a head portion (801) with a concave top surface. An annular plate (110) rests on the flanges (1022). A diaphragm (11), which is made of an elastic material, is provided on top of the head portion (801) and has a periphery which is hermetically sealed onto the annular plate (110). The head portion (801) is further provided with a pair of through holes (8011). A groove (803) is provided at the tip of the shaft portion (802). A screw driver (not shown) engages the groove (803) and is used to rotate the bolt (80) so as to lower or raise the diaphragm (11), thereby stretching or slackening the diaphragm (11). Stretching of the diaphragm (11) reduces the thickness of the same. When the diaphragm (11) is stretched, air passing through the holes (8011) in the head portion (801) can cause the diaphragm (11) to bulge by a degree corresponding to an inlet pressure from the tire and entering the air inlet (103). When the diaphragm (11) is slackened, a higher inlet pressure is required so as to permit the diaphragm (11) to bulge by the same degree. The bolt (80) is therefore operated so that the diaphragm (11) bulges by a desired degree corresponding to a predetermined pressure limit. This permits the preferred embodiment to generate an alarm signal when the tire pressure is below a predetermined low pressure limit or when the tire pressure is above a high pressure limit. Finally, the adaptor (1) has another open end (12) which is provided with an external thread.

Figure 2:
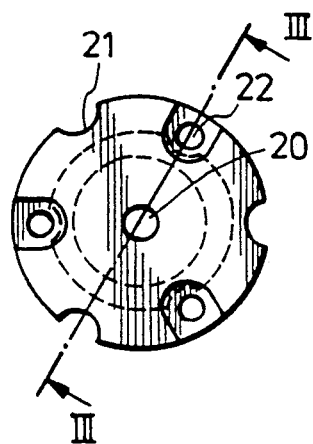
FIG. 2 is a top view of a disc member of the pressure gauge shown in FIG. 1.
Figure 3:
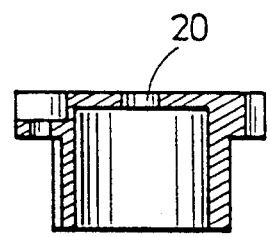
FIG. 3 is a sectional view of the disc member taken substantially along line III—III in FIG. 2.

The disc member (2) is provided inside the hollow adaptor (1) adjacent to the open end (12) of the latter. Referring to FIGS. 1 to 3, the disc member (2) is provided with a central hole (20). In order to facilitate proper placement of the disc member (2) in the hollow adaptor (1), the disc member (2) is formed with three angularly spaced peripheral notches (21). The notches (21) engage a respective upright rail projection (not shown) formed on the inner wall of the hollow adaptor (1). The disc member (2) is further formed with three angularly spaced peripheral screw holes (22). When the disc member (2) is provided inside the hollow adaptor (1), the screw holes (22) are aligned with a respective screw socket (14) which is similarly formed on the inner wall of the hollow adaptor (1). Screws are used to fasten the disc member (2) in the hollow adaptor (1).

Referring once more to FIG. 1, the push rod (3) has an enlarged base (31) disposed on top of the diaphragm (11) and a shaft (33) extending upwardly from the enlarged base (31) through the central hole (20) in the disc member (2). A compression spring (32) surrounds the portion of a shaft (33) between the base (31) and the disc member (2). Bulging of the diaphragm (11) causes a larger part of the shaft (33) to extend through the hole (20) against the action of the compression spring (32).

Figure 4:
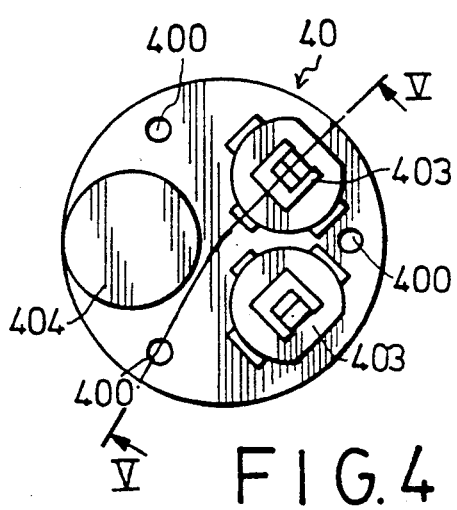
FIG. 4 is a top view of a first circuit board of the pressure gauge shown in FIG. 1.
Figure 5:
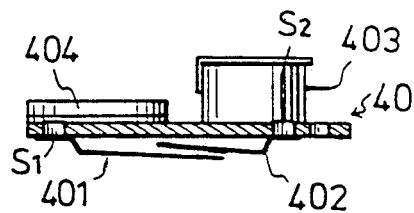
FIG. 5 is a sectional view of the first circuit board taken substantially along line V—V in FIG. 4.

The signal producing device (4) includes first and second circuit boards (40, 41). Referring to FIGS. 4 and 5, the first circuit board (40) is provided with three mounting holes (400), first and second conductor spring pieces (401, 402), an electric power source (403) and a signal producing unit (404). The power source (403) includes two mercury button cells provided on a top side of the first circuit board (40) and an electrical conductor (not shown) electrically connecting the button cells. The first and second spring pieces (401, 402) are provided on a bottom side of the first circuit board (40). Fasteners (S1, S2) respectively secure one end of the first and second spring pieces (401, 402) onto the first circuit board (40). The first and second spring pieces (401, 402) cooperatively form a normally open switch (SW2). The signal producing unit (404) is preferably a light emitting diode.

Figure 6:
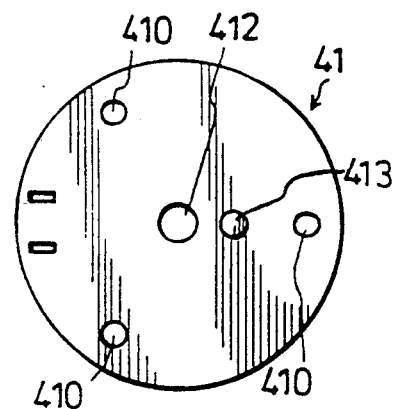
FIG. 6 is a top view of a second circuit board of the pressure gauge shown in FIG. 1.
Figure 7:
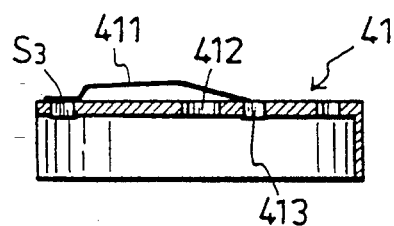
FIG. 7 is a sectional view of the second circuit board illustrating a conductor spring piece provided thereon.

Referring to FIGS. 6 and 7, the second circuit board (41) is provided with three mounting holes (410), a central through hole (412) and a conductor spring piece (411) which is provided on a top side of the second circuit board (41). A fastener (S3) secures one end of the spring piece (411) onto the second circuit board (41). An electrical contact (413) is provided on the second circuit board (41). The spring piece (411) and the electrical contact (413) cooperatively form a normally closed switch (SW1).

Referring once more to FIG. 1, the hollow adaptor (1) is formed with three upright second screw sockets (15). The mounting holes (400, 410) of the first and second circuit boards (40, 41) are aligned with one of the screw sockets (15). The second circuit board (41) is disposed below the first circuit board (40). Tubes (42) each of a predetermined length are provided between the mounting holes (400, 401) of the first and second circuit boards (40, 41), thereby spacing apart the first and second circuit boards (40, 41). Bolts (400) extend through the mounting holes (400) of the first circuit board (40), the tubes (42), the mounting holes (410) of the second circuit board (41) and into the screw sockets (15), thereby fastening the first and second circuit boards (40, 41) onto the hollow adaptor (1).

Figure 8:
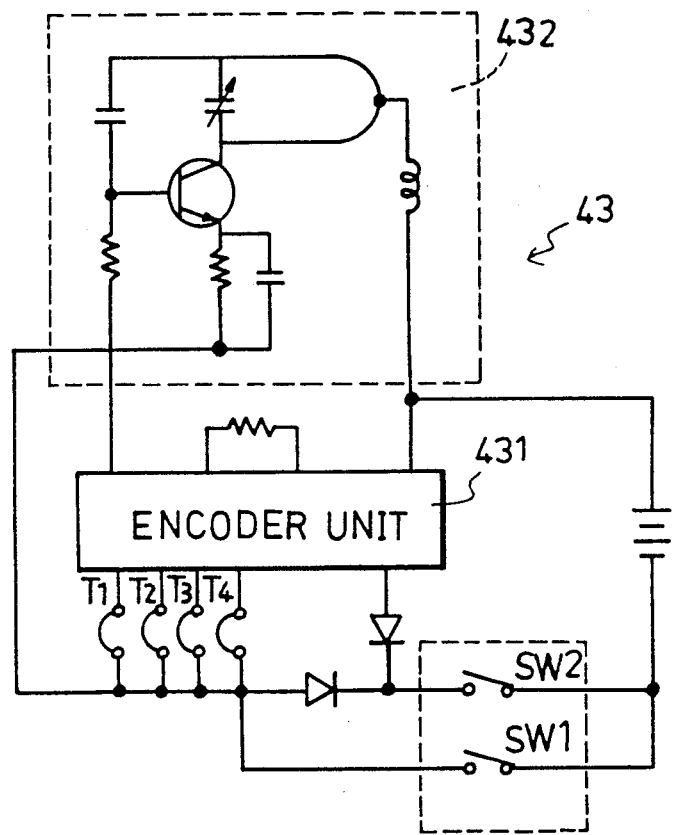
FIG. 8 is a schematic electrical circuit diagram of a signal transmitting unit of the pressure gauge shown in FIG. 1.

A signal transmitting unit (43) is disposed between the second circuit board (41) and the disc member (2). Referring to FIG. 8, the signal transmitting unit (43) comprises an encoder unit (431) and a transmitter circuit (432). The switches (SW1, SW2) activate the signal transmitting unit (43) whenever an under- or over-inflated tire condition is detected.

Figure 9:
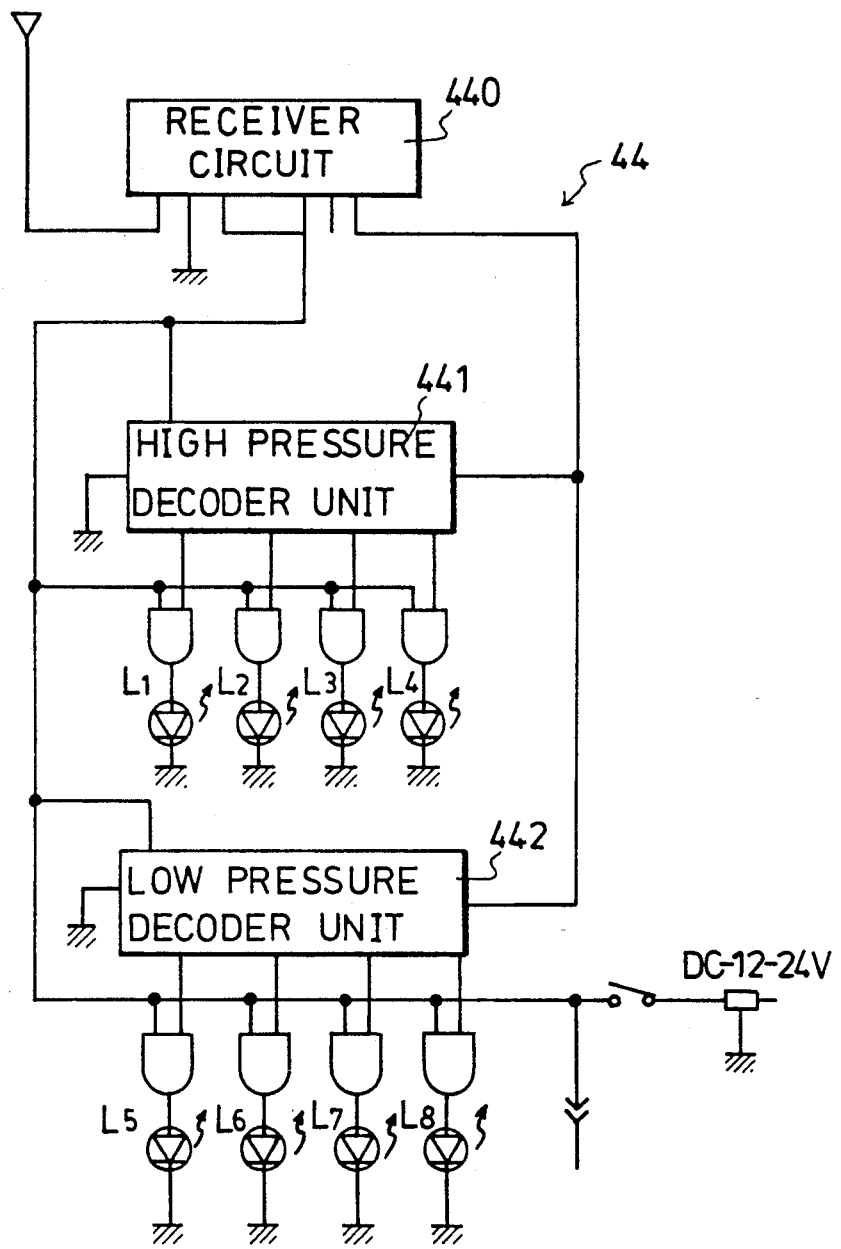
FIG. 9 is a schematic electrical circuit diagram of a receiver unit for receiving the electrical signals transmitted by the signal transmitting unit shown in FIG. 8.

The preferred embodiment of a tire pressure indicator according to the present invention comprises a plurality of the above-described pressure gauges (A). Each of the pressure gauges (A) is attached to a respective pneumatic tire of a vehicle. The tire pressure indicator further comprises a receiver unit (44) which receives electrical signals transmitted by the signal transmitting unit (43) of the pressure gauges (A). Referring to FIG. 9, the receiver unit (44) comprises: a receiver circuit (440); a high pressure decoder unit (441); four red light emitting diodes (L1-L4) connected to the decoder unit (441), each of the light emitting diodes (L1-L4) being used to indicate if a corresponding one of the tires of the vehicle is over-inflated; a low pressure decoder unit (442); and four yellow light emitting diodes (L5-L8) connected to the decoder unit (442), each of the light emitting diodes (L5-L8) being used to indicate if a corresponding one of the tires of the vehicle is under-inflated. The receiver unit (44) is preferably disposed inside the driver room of the vehicle adjacent to the instrument panel, thereby making it easy for the driver to check the status of the light emitting diodes (L1-L8).

Referring again to FIG. 1, the cap (5) is a transparent body which has a round closed end and an internally threaded open end which threadedly couples the open end (12) of the hollow adaptor (1). The inner surface of the casing (5) is provided with a series of rounded bumps which enhance the light output from the signal producing unit (404).

Operation of the preferred embodiment is as follows: A pressure gauge (A) is attached to the inflating valve of each of the pneumatic tires of the vehicle. The bolt (80) in each pressure gauge (A) has been adjusted beforehand so that a maximum point on the diaphragm

(11) is at a predetermined height from the partition plate (101). The inlet pressure which enters the inlet (103) causes the diaphragm (11) to stretch and bulge by a degree corresponding to the tire pressure. If the tire pressure is within a predetermined normal pressure range, the diaphragm (11) moves the push rod (3) upward so that the shaft (33) of the latter extends through the hole (20) of the disc member (2) and further through the hole (412) of the second circuit board (41), thereby pushing the spring piece (411) away from the electrical contact (413) to open the switch (SW1). The switch (SW1) connects electrically the power source (403) and the signal producing unit (404). The opening action of the switch (SW1) breaks electrical connection between the power source (403) and the signal producing unit (404), thereby preventing the light emitting diode of the signal producing unit (404) from operating.

The switch (SW2) remains open at this stage to indicate that the tire pressure is within the predetermined normal pressure range.

If the tire is under-inflated, the diaphragm (11) is incapable of moving the push rod (3) so as to push the spring piece (411) away from the electrical contact (413) and open the switch (SW1). The switch (SW1) remains closed to indicate that the tire is under-inflated. Electrical connection between the power source (403) and the signal producing unit (404) is maintained, and the light emitting diode of the signal producing unit (404) is in an activated state, thereby indicating that the tire pressure is not within the normal operating range.

If the tire is over-inflated, the diaphragm (11) moves the push rod (3) so that the shaft (33) pushes the spring piece (411) away from the electrical contact (413), thereby opening the switch (SW1), and causes the the first spring piece (401) to contact the second spring piece (402), thereby closing the switch (SW2) so as to indicate that the tire is over-inflated. Contact between the spring pieces (411, 401) can effect electrical connection between the power source (403) and the signal producing unit (404), thereby activating the light emitting diode of the signal producing unit (404) so as to indicate that the tire pressure is not within the normal operating range.

Referring once more to FIG. 8, fuses (T1-T4) are connected to the encoder unit (431) and are used to set an identification code unique to that pressure gauge (A). The switches (SW1, SW2) control the encoder unit (431) so as to transmit an appropriate code whenever an under- or over-inflated condition exists.

When the tire pressure is within the normal operating range, the switches (SW1, SW2) of the pressure gauge (A) are opened. The encoder unit (431) does not provide information to the transmitter circuit (432) at this stage. When the tire pressure is below a predetermined low pressure limit, the switch (SW1) is closed while the switch (SW2) remains opened. The switch (SW1) activates the encoder unit (431) to provide to the transmitter circuit (432) a first code which is unique to that pressure gauge (A). When the tire pressure is above a predetermined high pressure limit, the switch (SW1) is opened while the switch (SW2) is closed. The switch (SW2) activates the encoder unit (431) to provide to the transmitter circuit (432) a second code which is unique to that pressure gauge (A).

The first or second codes from the encoder unit (431) modulate a 300 MHz carrier which is generated by the transmitter circuit (432). The electrical signals which are transmitted by the transmitter circuit (432) of the pressure gauges (A) are received by the receiver unit (44).

Referring to FIG. 9, the receiver circuit (440) receives and demodulates the electrical signals transmitted by the pressure gauges (A) and provides the same to the decoder units (441, 442). The decoder units (441, 442) decode the received signals and activate one of the light emitting diodes (L1-L8) in accordance with the decoded signals. The driver of the vehicle can therefore determine easily which one of the tires is under- or over-inflated by simply checking the status of the light emitting diodes (L1-L8).

Note that the light emitting diode of the signal producing unit (404) is similarly activated whenever an under- or over-inflated condition is detected. The signal producing unit (404) can thus serve to inform the driver as to which one of the tires has a pressure that is not within the normal operating range even though he is not inside the vehicle.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A pressure gauge for a pneumatic tire, comprising:
   a casing having a hollow adaptor to be attached to the pneumatic tire, an air inlet and a finer piece for opening an inflating valve of the tire;
   pushing means disposed inside said casing adjacent to said air inlet and being movable, in response to an inlet pressure entering through said air inlet, between a first position in which said inlet pressure is below a predetermined low pressure limit and a second position in which said inlet pressure is above a predetermined high pressure limit;
   a spring-loaded push rod movably mounted inside said casing and being moved by said pushing means;
   a signal producing unit provided inside said casing and having first and second switch devices which are controlled by the movement of said push rod, said first switch device activating said signal producing unit when said pushing means is in said first position, said second switch device activating said signal producing unit when said pushing means is in said second position; wherein said first switch device comprises a first circuit board mounted inside said casing above said pushing means and being formed with a central hole to permit said push rod to extend therethrough, a first conductor spring piece provided on a top side of said first circuit board and having one end fastened to said first circuit board, and an electrical contact provided on said first circuit board, and wherein said first spring piece and said electrical contact cooperatively form a normally closed switch, said push rod is incapable of pushing said first spring piece away from said electrical contact to break electrical connection when said pushing means is in said first position, and said push rod pushes said first spring piece away from said electrical contact when said pushing means is in said second position.

2. The pressure gauge as claimed in claim 1, wherein said pushing means comprises a diaphragm and wherein said finger piece is formed with a threaded axial bore and
   said pressure gauge further comprises a bolt having a threaded shaft portion extending into said bore of said finger piece and a head portion disposed between said air inlet and said diaphragm.

3. The pressure gauge as claimed in claim 1, wherein said second switch device comprises:
   a second circuit board mounted inside said casing above said first circuit board; and
   second and third conductor spring pieces provided on a bottom side of said second circuit board, each of said second and third spring pieces having one end fastened to said second circuit board, said second and third spring pieces cooperatively forming a normally open switch, said push rod pushing said second spring piece to connect electrically said second and said third spring pieces when said diaphragm is in said second position.

4. A tire pressure indicator for a set of pneumatic tires of a vehicle, comprising:
   a plurality of pressure gauges respectively attached to the pneumatic tires, each of said pressure gauges including a casing having a hollow adaptor to be attached to the respective pneumatic tire, an air inlet and a finger piece for opening an inflating valve of the tire; pushing means disposed inside said casing adjacent to said air inlet and being movable, in response to an inlet pressure entering through said air inlet, between a first position in which said inlet pressure is below a predetermined low pressure limit and a second position in which said inlet pressure is above a predetermined high pressure limit; a spring-loaded push rod movably mounted inside said casing and being moved by said pushing means; and a signal transmitting unit provided inside said casing and having first and second switch devices which are controlled by the movement of said push rod, said first switch device activating said signal transmitting unit to transmit a first code unique to that gauge when said pushing means is in said first position, said second switch device activating said signal transmitting unit to transmit a second code unique to that gauge when said pushing means is in said second position;
   a receiver device for receiving said first and second codes transmitted by said signal transmitting unit of said pressure gauges, said receiver device including first and second light emitting units, one of said first light emitting units being activated upon reception of said first codes so as to indicate which one of the tires is under-inflated, one of said second light emitting units being activated upon reception of said second code so as to indicate which one of the tires is over-inflated wherein said first switch device comprises a first circuit board mounted inside said casing above said pushing means and being formed with a central hole to permit said push rod to extend therethrough, a first conductor spring piece provided on a top side of said first circuit board and having one end fastened to said first circuit board and an electrical contact provided on said first circuit board, and wherein said first spring piece and said electrical contact cooperatively form a normally closed switch, said push rod is incapable of pushing said first spring piece away from said electrical contact to break electrical connection when said pushing means is in said first position, and said push rod pushes said first spring piece away from said electrical contact when said pushing means is in said second position.

5. The tire pressure indicator as claimed in claim 4, wherein said pushing means comprises a diaphragm and wherein:
   said finger piece is formed with a threaded axial bore; and
   each of said pressure gauges further includes a bolt having a threaded shaft portion extending into said bore of said finger piece and a head portion disposed between said air inlet and said diaphragm.

6. The tire pressure indicator as claimed in claim 4, wherein said second switch device comprises:
   a second circuit board mounted inside said casing above said first circuit board; and
   second and third conductor spring pieces provided on a bottom side of said second circuit board, each of said second and third spring pieces having one end fastened to said second circuit board, said second and third spring pieces cooperatively forming a normally open switch, said push rod pushing said second spring piece to connect electrically said second and said third spring pieces when said diaphragm is in said second position.

7. The tire pressure indicator as claimed in claim 4, wherein said receiver device further comprises a low pressure decoder unit which activates one of said first light emitting units in accordance with the received said first code and a high pressure decoder unit which activates one of said second light emitting units in accordance with the received said second code.

* * * * *